(12) United States Patent
Whitefield (10) Patent No.: US 8,899,599 B2
(45) Date of Patent: Dec. 2, 2014

(54) CLAMPING MECHANISM FOR A TWO WHEEL PANEL DOLLY

(71) Applicant: Bruce Joseph Whitefield, Camas, WA (US)

(72) Inventor: Bruce Joseph Whitefield, Camas, WA (US)

(*) Notice: Subject to any disclaimer, the term of this patent is extended or adjusted under 35 U.S.C. 154(b) by 18 days.

(21) Appl. No.: 13/730,919

(22) Filed: Dec. 29, 2012

(65) Prior Publication Data

US 2014/0015211 A1 Jan. 16, 2014

Related U.S. Application Data

(60) Provisional application No. 61/632,226, filed on Jan. 20, 2012.

(51) Int. Cl.
*B62B 1/00* (2006.01)
*B62B 1/26* (2006.01)

(52) U.S. Cl.
CPC ..................... *B62B 1/268* (2013.01)
USPC ............................ 280/79.11; 414/10; 280/35

(58) Field of Classification Search
USPC .................. 280/35, 79.7, 79.11; 414/10, 490; 24/494, 486, 596
See application file for complete search history.

(56) References Cited

U.S. PATENT DOCUMENTS

| | | |
|---|---|---|
| 3,845,969 A | 11/1974 | Nadeau |
| 4,274,741 A | 6/1981 | Cornillault |
| 4,695,067 A | 9/1987 | Willey |
| 5,284,410 A | 2/1994 | Spector |
| 5,820,145 A | 10/1998 | Osowski |
| 5,988,659 A | 11/1999 | Young |
| 6,234,499 B1 | 5/2001 | Irwin |
| 6,250,655 B1 | 6/2001 | Sheeks |
| 6,308,969 B1 | 10/2001 | Young |
| 6,663,123 B1 | 12/2003 | Kovacs |
| 6,866,274 B1 | 3/2005 | Muscat |
| 7,896,367 B1 | 3/2011 | Suprono |
| 8,002,510 B2 | 8/2011 | Williams |
| 8,100,419 B2 | 1/2012 | Morisset |

*Primary Examiner* — John Walters
*Assistant Examiner* — James Triggs (57) ABSTRACT

This patent is for a clamping mechanism for a two wheel panel dolly which is operated by turning a handle attached to the wheel axle. A threaded section of the axle is engaged with a threaded base clamp so that axle rotation drives the clamp along the axle to firmly grip a panel between the driven clamp and a the face of second clamp. Clamps are configured with different spacing between faces on opposite sides of the axle so that a wide range of panel widths can be accommodated with a relatively short clamping travel distance.

12 Claims, 6 Drawing Sheets

CLAMPING MECHANISM FOR A TWO WHEEL PANEL DOLLY

FIELD OF THE INVENTION

The following invention relates to clamping of panels and other relatively thin but elongated or wide objects such as plywood, doors and sheetrock to a wheeled carrier.

BACKGROUND OF THE INVENTION

There is a well recognized need for devices that enable a single individual to transport heavy and awkward panel shaped objects such as plywood sheets, gypsum board, tables, doors and similarly shaped objects. This is evident by a number of patented devices for this purpose and several commercially available products.

Many different methods and apparatus are available for this type of transport. Some methods involve placing the panel onto four wheel carts or dollies. Others use two wheel hand trucks which support a panel from the side. Another approach is to use a two wheel dolly which supports the panel by an edge with wheels placed parallel to the panel face on opposite sides of the panel.

Two wheel dollies provide advantages compared to four wheel carts, four wheel dollies and two wheel hand trucks. The smaller size and configuration of a wheel placed on each side of the dolly provides stable support while enabling panels to be maneuvered through narrow openings.

Despite advantages that two wheel panel dollies have over four wheel carts, four wheel dollies and hand trucks, the existing two wheel dolly designs also have several disadvantages which have prevented widespread adoption. Two key challenges are to provide a suitable method to secure a panel to a dolly and a method to hold a dolly in place while a panel is loaded onto it.

Patents of prior art document several methods to secure a panel to a two wheel dolly such as resting the panel on a high friction surface, V or U grooves, a vertical support, clamping bars and screw clamps applied to the sides of the panel.

Several other methods have been used to hold the dolly in place while a panel is set onto it such as stabilizing legs, long arms and locking levers.

The following patents reflect prior art and methods for securing panels to two wheeled dollies:

| | | |
|---|---|---|
| U.S. Pat. No. 3,845,969 | Nov. 5, 1974 | Nadeau |
| U.S. Pat. No. 4,270,741 | Jun. 1, 1981 | Hurst |
| U.S. Pat. No. 5,284,410 | Feb. 8, 1994 | Spector |
| U.S. Pat. No. 4,695,067 | Sep. 22, 1987 | Willey |
| U.S. Pat. No. 5,820,145 | Oct. 13, 1998 | Osowski |
| U.S. Pat. No. 5,988,659 | Nov. 13, 1999 | Young |
| U.S. Pat. No. 6,234,499 | May 22, 2001 | Irwin |
| U.S. Pat. No. 6,250,655 | Jun. 6, 2001 | Sheeks |
| U.S. Pat. No. 6,663,123 | Dec. 16, 2003 | Kovacs |
| U.S. Pat. No. 6,886,274 | Mar. 15, 2005 | Muscat |
| U.S. Pat. No. 7,896,367 | Mar. 1, 2011 | Suprono |
| U.S. Pat. No. 8,002,510 | Aug. 23, 2011 | Williams |
| U.S. Pat. No. 6,308,969 | Oct. 30, 2011 | Young |
| U.S. Pat. No. 8,100,419 | Jan. 24, 2012 | Morisset |

One disadvantage of current techniques and designs is that placing a panel onto the dolly requires a user to pick up a heavy and awkward panel, and then accurately place the panel edge into a narrow slot or opening that is itself on a rolling platform. This task eliminates much of the advantage of using a two wheel dolly since manual lifting and maneuvering, which is difficult for a single user, must still be done and may require help from a second person.

Another disadvantage of current two wheel dollies is the methods for balancing and securing the load over the wheels. A panel that is not securely attached can bounce and slip during movement. During transport a panel may need to be lifted over an obstacle such as a curb or stairs. If not firmly attached, or without constant action from the user, the panel and dolly will be separated and must then be reattached after moving both over the obstacle. Methods that rely on the weight of the object to provide clamping force are not effective for this purpose since lifting the object will remove the clamping force.

The width of panels expected to be transported by a single user typically range from a quarter inch for a sheet of plywood to three inches for a door or window frame. Current designs for clamps that apply pressure to the panel sides cannot accommodate this range of widths, or require additional adjustments and time spent by the user.

Some patented two wheel dollies provide clamping mechanisms to secure the panel to the dolly which significantly increases the size and weight of the dolly that must be carried with the panel or removed if it is lifted over an obstacle. Other clamping mechanisms involve long arms or bars which make the two wheel dolly awkward to store and transport.

Clamping mechanisms with a long bar arranged vertically to provide a sliding clamp from the top cannot clamp more than one panel at a time if the panels have different heights. For example, if a forty eight inch wide sheet of plywood is carried with a thirty six inch wide sheet of plywood, only the larger panel can be clamped.

BRIEF SUMMARY OF THE INVENTION

This invention is for a clamping mechanism for use on a two wheel dolly that can be used by a single person to transport panels or other long and wide but relatively thin panel shaped items.

The invention has an adjustable clamping mechanism operated by turning a handle attached to the axle. Axle rotation relative to the clamps causes a threaded portion of the axle to drive a threaded clamping base and an attached clamp face laterally along the axle towards a second clamp face which is laterally fixed to the axle. Rotating the handle thus secures a panel between the two clamp faces in a vise-like fashion.

The geometry of the clamping surfaces is designed to create different clamping widths on opposite sides of the axle's axis. This way a single mechanism can accommodate a wide range of panel widths with a minimum clamp travel distance.

Another feature of the clamp geometry is to create an interlocking surface between the opposing sides of the clamp which maintains them in a constant position relative to each other, even as both are free to rotate around the axle.

Using components for multiple purposes such as combining wheel axle with clamping threads and multiple clamping faces with alternate spacing enables a light weight and compact design which is easily carried and stored. The dolly can be lifted by a single user and clamped to a panel before the panel is fully removed from a storage stack or storage rack. The panel with the dolly attached can then be placed upright, with the wheels on the ground or floor, ready for transport.

Advantages of the Invention

This invention is for a two wheel dolly panel clamping mechanism that which enables construction of a light weight two wheel dolly that is easily used by a single person to transport panels or other long and wide but relatively thin panel shaped items.

The wheel axle and clamping mechanism is provided by a single part with clamping achieved by means of a threaded screw attached or built into the axle which drives interlocking clamps.

Integrating the clamp mechanism into the axle significantly reduces the complexity and number of parts compared to the methods described in the prior art. A dolly using this invention can be made light enough that it can be picked up and clamped to a panel before the panel is fully removed from a storage stack or rack. This reverses the sequence of the prior art which is to first lift panels onto the dolly. Clamping wheels first to a panel is superior since the clamping operation is easily accomplished by a single user when they only need to hold the dolly and turn the clamp handle and do not need to lift the panel at the same time.

Clamping the dolly to the panel first also eliminates the need for arms, legs or locks to hold the dolly in place it is being loaded. This also helps to reduce weight and complexity of the dolly.

After clamping to a panel, a dolly using this invention will remain securely attached while the panel is moved to place the wheels on the floor. It will remain clamped throughout transportation and due to it's light weight will remain attached if a panel has to be lifted over an obstacle.

This is an advantage over dolly's made with methods in the prior art which are too heavy to remain attached or easily lifted with the panel. Clamps that rely on the weight of the panel to provide a clamping force cannot be lifted by the panel without releasing the clamp.

The geometry of the clamps in this invention creates different clamping widths on opposite sides of the axle's axis. This enables a user to select the clamp width that best fits a wide range of panel thicknesses without making adjustments. A single dolly will then be able to accommodate a wide range of panel widths. Clamp travel distance is minimized so that the number of handle turns needed to operate the clamp is also minimized.

Integrating functions into the same component and multiple size spacing of the clamps also results in a dolly with a compact size which is easy to store or transport.

BRIEF DESCRIPTION OF FIGURES

FIG. 3—Shows perspective views of the clamping mechanism from each side. A perspective view from the threaded clamp 13 side is shown in FIG. 3A and a perspective view from opposite unthreaded clamp 12 side is shown in FIG. 3B. Panel 20, wheels 19 and threaded clamp stop 25 are omitted in these Figures to enable a clear view of the clamping mechanism.

FIG. 6—Is an illustration of a user clamping the dolly onto a panel that is stored vertically in a slot or rack.

FIGURE REFERENCE NUMERALS

10—two wheeled dolly
11—axle
12—unthreaded clamp
13—threaded clamp
14—handle
15—unthreaded clamp stop
16—threaded sleeve
17—threaded base
18—friction pads
19—wheels
20—narrow panel
21—wide panel
22—wide clamp area
23—narrow clamp area
24—weight
25—threaded clamp stop
26—user

DETAILED DESCRIPTION OF THE INVENTION

The invention is for a clamping mechanism on a two wheeled panel dolly where the wheels rotate on an axle that runs under and perpendicular to the panel so that the wheels are located to either side of the panel. The panel being transported is supported on one edge by a longitudinal support through which the axle is run in a perpendicular direction.

Figure 1:
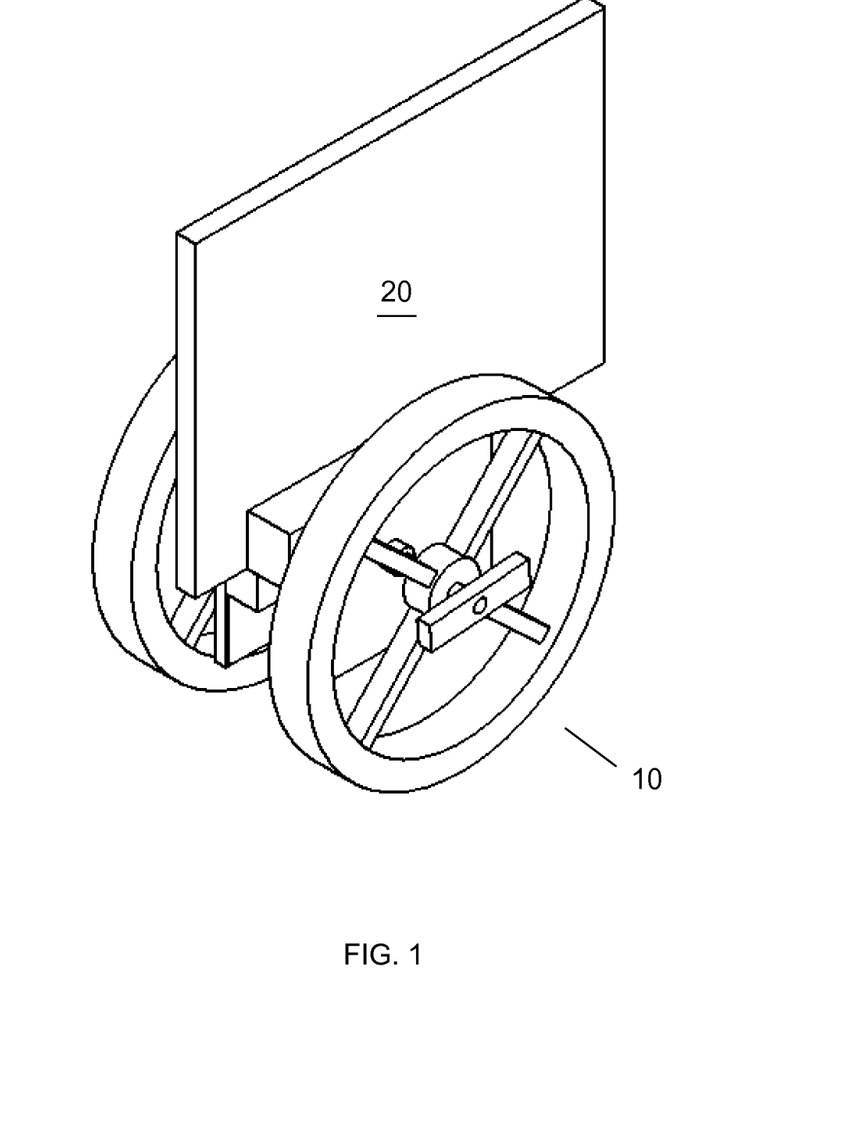
FIG. 1—Is a view of a two wheel dolly using the clamping mechanism of this invention to hold a panel.

FIG. 1 shows an overview of dolly 10 using the clamping mechanism of this invention to hold a panel 20. Panel 20 is drawn small for clarity of the illustration but can be of any arbitrary length or height and also of any width that fits the maximum spacing of the clamps.

Figure 2:
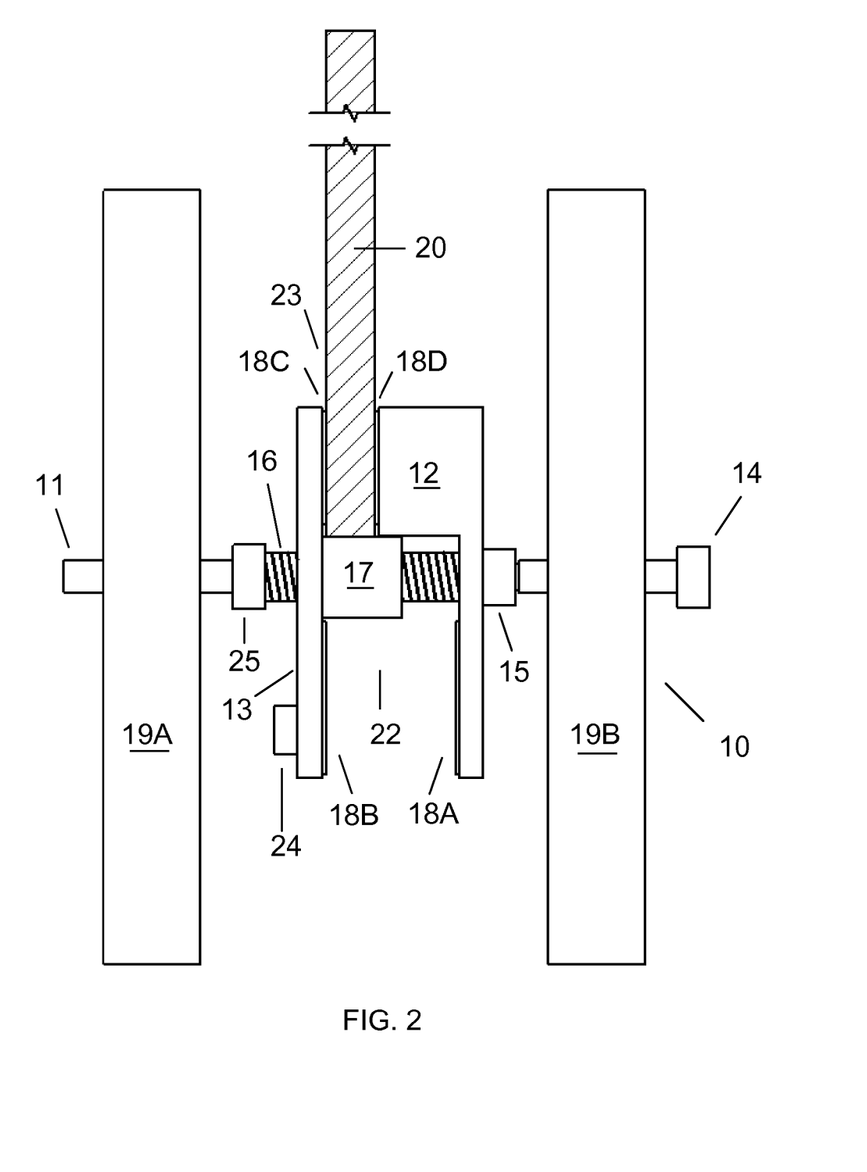
FIG. 2—Is a front view of the two wheeled dolly and the clamping mechanism. The base is shown oriented with the narrow panel clamp area on top and holding the edge of a panel.

FIG. 2 shows a front view of the dolly 10. Axle 11 is supported by two wheels, 19A and 19B, which can rotate freely around axle 11 by means of a bearing or suitable bearing surface. A panel 20 is supported by a threaded base 17 located between wheel 19A and wheel 19B. The threaded base 17 is supported by a threaded sleeve 16 located on axle 11. The threaded sleeve 16 is solidly affixed to axle 11 so that it will rotate with the axle and cannot slide in either direction along the length of axle 11.

A threaded clamp 13 is rigidly attached to the threaded base 17 so that together they form one side of the clamping mechanism and a base to support panels. The opposing clamp surface is formed by the unthreaded clamp 12. The L shaped geometry of the unthreaded clamp 12 forms an overlapping surface with the threaded base 17 so that the two sides of the clamping mechanism are interlocked and cannot rotate relative to each other while both can rotate around the axis of axle 11 and can also move towards and away from each other.

Unthreaded clamp 12 is mounted to axle 11 by means of a hole through which axle 11 is placed. The thickness of the clamp plate and tight clearance of the hole around axle 11 must be sufficient to hold the unthreaded clamp 12 perpendicular to axis of axle 11 while the unthreaded clamp 12 remains free to rotate around axle 11. FIG. 3 shows this more clearly by omitting wheels 19. Both FIG. 2 and FIG. 3B show views of the unthreaded clamp stop 15 which is used to prevent the unthreaded clamp 12 from sliding along the length of axle 11 when a clamping force is applied. The unthreaded clamp stop 15 can be made in any of a variety of ways which are commonly used for holding items fixed longitudinally along the axis of a rotating shaft.

Axle 11 can be made of a material, such as steel rod, which has sufficient strength and rigidity to support panels of the desired weight across the distance between the two wheels.

Figure 3A:
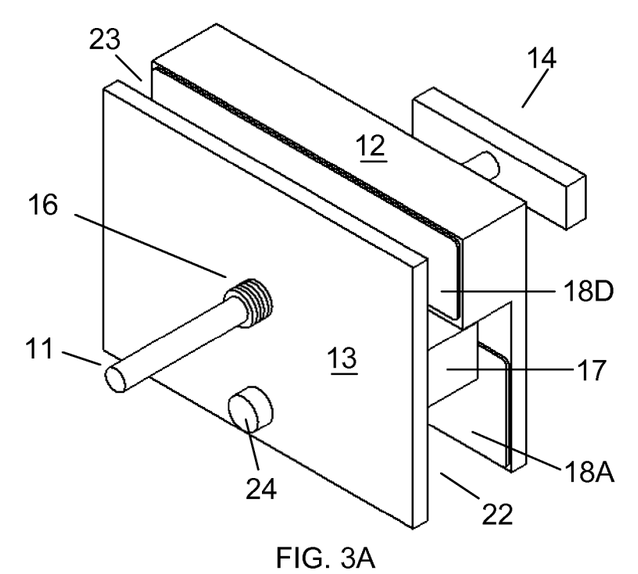
Figure 3B:
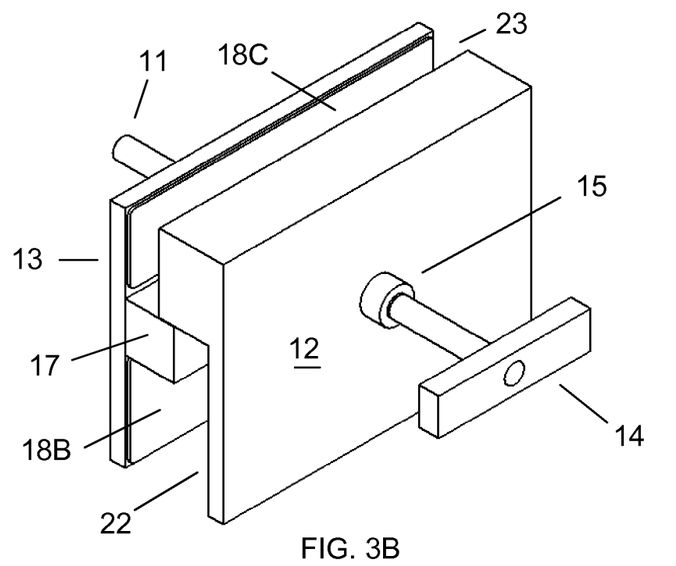

FIG. 3A shows the threaded sleeve 16 on axle 11. The threaded sleeve 16 has a larger diameter than the axle 11 and is solidly fixed in place on axle 11 so that when axle 11 is rotated the threaded sleeve 16 will also rotate.

As shown in FIG. 2, the unthreaded clamp 12 is locked in position along the length of the axle 11 between the unthreaded clamp stop 15 and the edge of the larger diameter threaded sleeve 16, while being free to rotate around the axis of axle 11.

Threaded sleeve 16 extends a distance from the fixed base 12 along the center portion of the axle 11. Both ends of the axle 11 shaft are left as a smooth surface on which the wheels 19A and 19B can freely rotate or alternately rotate on a bearing fixed to axle 11. The length of threaded sleeve 16 will determine the maximum opening width of the clamping mechanism. The preferred length of sleeve 16 will be approximately equal to the combined widths of threaded base 17 and the overlapping L portion of unthreaded clamp 12.

To prevent clamps from being opened too far and causing the interlocking surfaces of unthreaded clamp 12 and threaded base 17 to become disengaged, a threaded clamp stop 25 which has a diameter larger than the threaded sleeve can be fixed to axle 11.

Threaded sleeve 16 can be fixed in position on the axle 11 by a variety of common means such as a welding, press fit, adhesive or machining a thread into the shaft. Threaded sleeve 16 can be made of any material such as steel or high impact plastic which has the strength to hold threads and support the weight of the panel.

FIG. 2 also shows a threaded base 17 which is firmly fixed to the threaded clamp 13. Threaded base 17 provides a support for panel 20. A threaded hole through both threaded base 17 and threaded clamp 13 has a thread size matching that of threaded sleeve 16. Threaded base 17 is mated with threaded sleeve 16 so that when axle 11 is rotated, thus rotating threaded sleeve 16 relative to threaded base 17, the threaded base 17 and attached threaded clamp plate 13 will be driven along the shaft by means of the threads. Depending on the direction of rotation, threaded clamp 13 will be moved towards or away from unthreaded clamp plate 12. This movement of threaded base 17 and threaded clamp 13 along the shaft axis towards the locked in place unthreaded clamp 12 forms a mechanism to clamp panels between their opposing faces.

Axle 11 can be rotated by a user by means of an attached handle 14 placed outside the wheels on either end of the axle 11. To unclamp a panel the user reverses the rotation to separate the clamps.

An important feature of the unthreaded clamp 12 and threaded base 17 that can be seen in FIG. 2 is that the L shape of unthreaded clamp 12 forms overlapping parallel surface with threaded base 17. The overlapping surfaces keep the threaded base 17 and threaded clamp 13 aligned and parallel to the unthreaded clamp 12 throughout the clamping procedure. FIG. 3A and FIG. 3B show the overlapping surfaces which are free to slide past each other so the clamping motion is not hindered.

An aspect of unthreaded clamp plate 12 and threaded clamp plate 13 is that they are configured with different spacing between the clamping surfaces on opposite sides of the axis of axle 11. FIG. 2 shows an end view of the wide clamp area 22 and narrow clamp area 23 where panel 20 is clamped. The panel clamp areas are between the opposing faces of unthreaded clamp plate 12 and threaded clamp plate 13.

Figure 4:
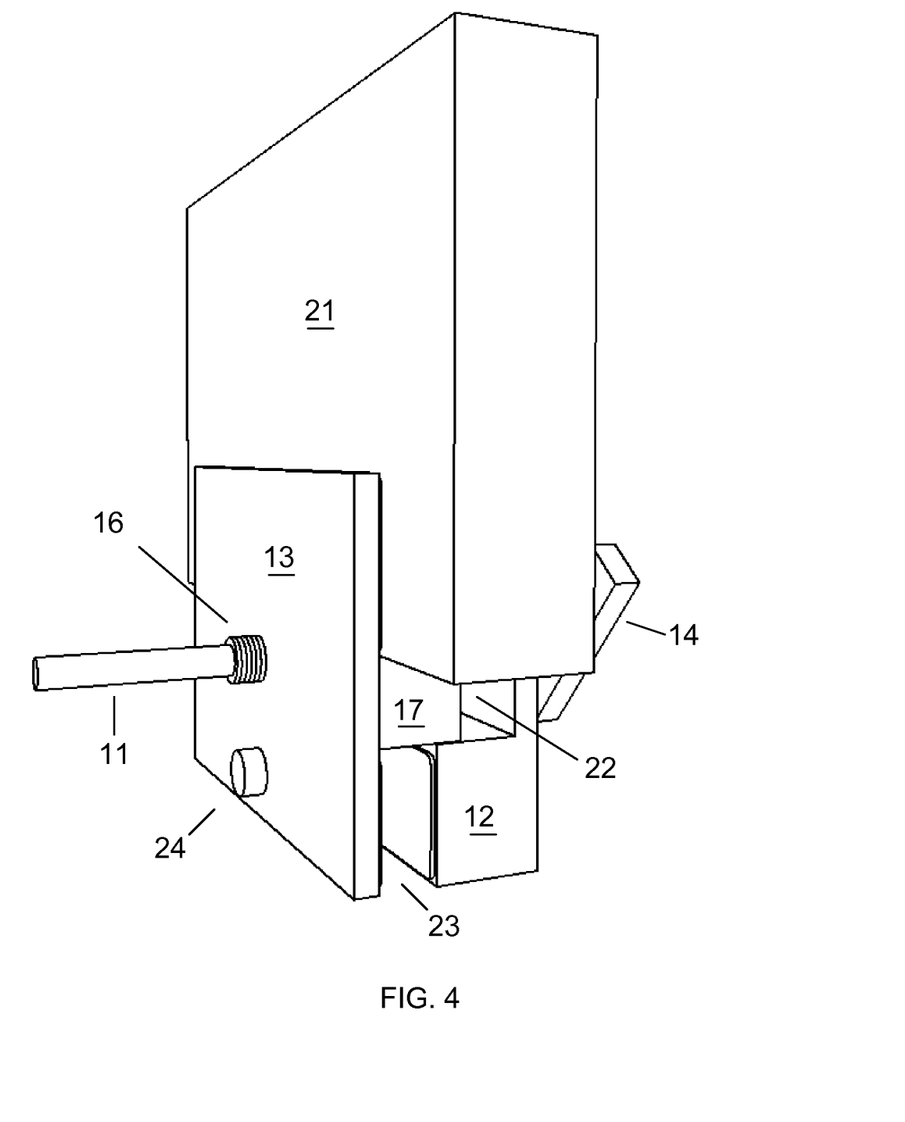
FIG. 4—Is a perspective view with the clamps rotated around the axis of the axle to use the alternate width clamp area to hold a wider panel. Wheels 19 and threaded clamp stop 25 are omitted in this Figure to enable a clear view of the clamping mechanism.

The narrow clamp area 23 is designed for thin panels like plywood. The wide clamp area 22 is intended for wider panels like doors. In this way a relatively short travel distance of threaded base 17 along threaded sleeve 16 can accommodate a variety of panel widths. FIG. 4 shows threaded clamp 13 interlocked with unthreaded clamp 12 and rotated around axis of axle 11 so that the wide clamp area 22 is on top and can be used to clamp and hold a wide panel 21.

The panel clamping surfaces of the unthreaded clamp 12 and threaded clamp 13 are shown in FIG. 3. These surfaces are shown with optional strips of high friction pads 18A, 18B, 18C and 18D. Friction pads 18 can be used to improve the grip of the clamp on slippery panel materials and to protect soft panel materials from damage by the clamping force. Friction pads 18 can be made from a variety of materials that are commonly employed for such purpose such as a rubber or plastic.

Unthreaded clamp plate 12, threaded base 17 and threaded clamp plate 13 can be made from any material with sufficient rigidity and strength. Stamped steel, extruded aluminum or high strength plastic are examples suitable materials for these parts.

Figure 5:
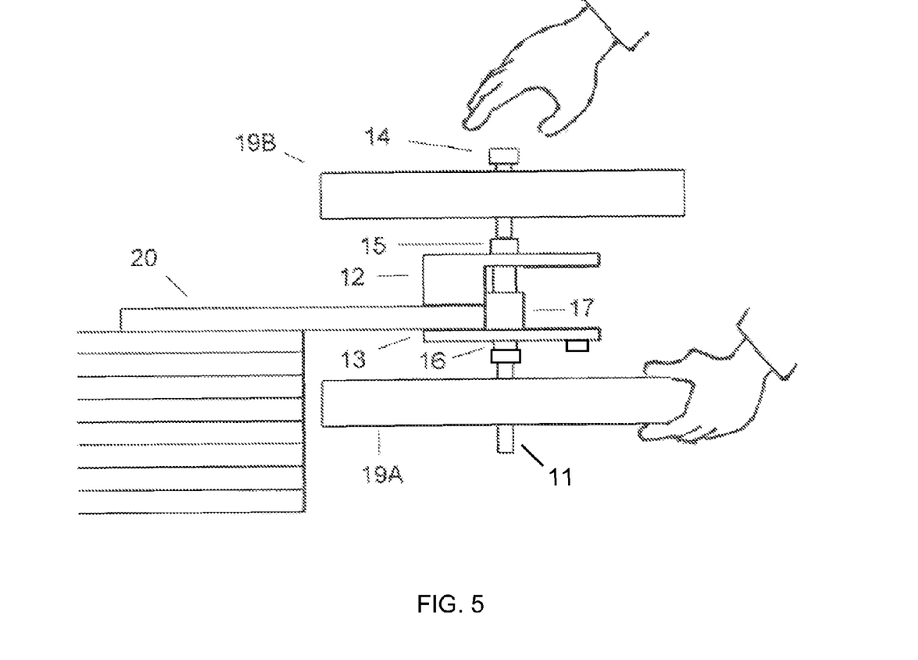
FIG. 5—Is a side view of the dolly and clamp mechanism illustrating how a user can clamp a two wheel dolly onto a panel which is only partially removed from a stack of panels.

Operation of the clamping mechanism is designed so that dolly 10 can be lifted and clamped onto a panel before the panel is fully removed from a stack or rack in which it is stored. FIG. 5 illustrates how a user would hold and clamp dolly 10 to a panel 20 by turning the handle 14. The figure also shows how the top panel in a stack need only be slid out from a stack by a distance of approximately half the diameter of the wheels 19 before there is clearance to clamp dolly 10 in place. This enables a user to secure dolly 10 on the panel 20 first and then place the combined panel 20 and dolly 10 onto the ground supported by the wheels. Ability to attach dolly 10 before removing panel 20 from a stack of panels means users do not need to pick up panels in order to place them onto a carrier.

Figure 6A:
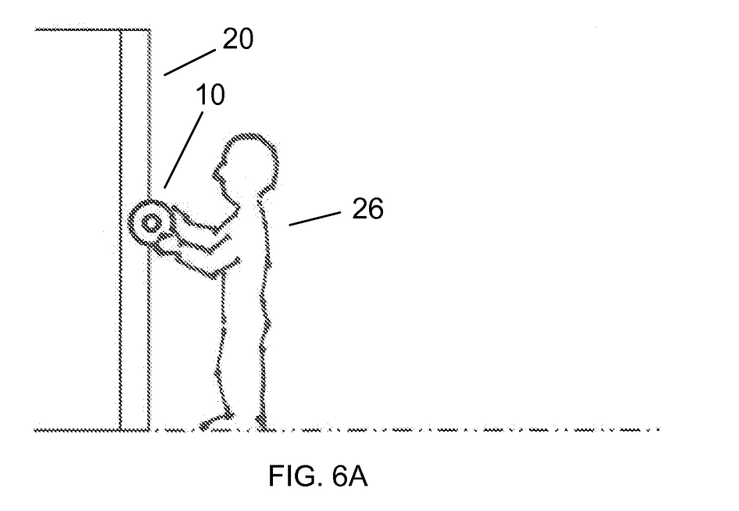
FIG. 6A shows the dolly being clamped to a panel and FIG. 6B then shows how the user can lower the panel with the dolly attached until the panel is supported by the dolly wheels.
Figure 6B:
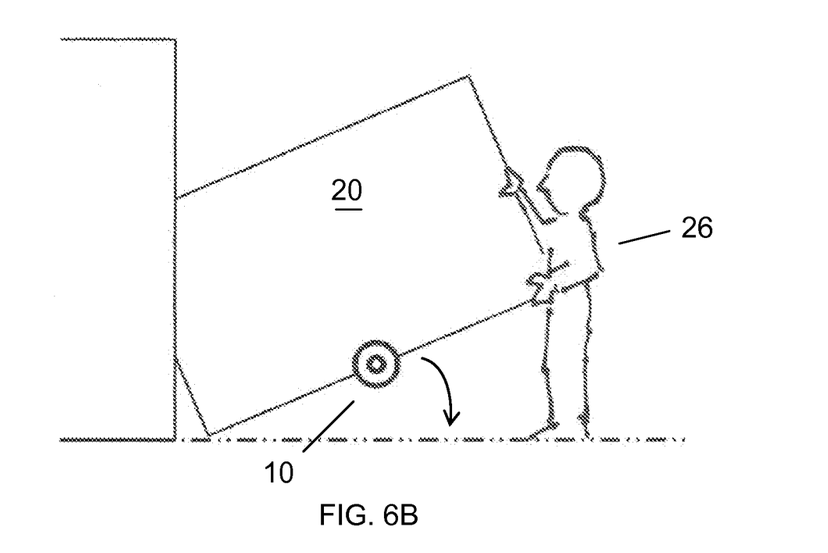

FIG. 6A and FIG. 6B illustrate how a user 26 can clamp a dolly 10 to a panel 20 which is partially slid out from a group of panels that have been stored vertically in a slot or rack. FIG. 6B illustrates how panel 20 can be lowered onto the wheels and made ready to transport.

There may be times when panels are stored in a manner where clamping the dolly to it in advance is not feasible. In these cases the panel 20 will need to be placed onto the threaded base 17 while dolly 10 is on the ground. In this case it is desirable to have the appropriate clamp width area oriented on top.

The clamp pieces are design to have a preferred orientation so that the most frequently used clamping area will be presented on top. It can be noted in FIG. 2 that the clamping surfaces of both unthreaded clamp 12 and threaded clamp 13 have longer clamping surfaces enclosing the wide clamp area 22. The extra weight and leverage of the longer surfaces will cause that side to be normally oriented down towards the floor to orient the opposite and preferred narrow clamp area 23 on top. If longer clamping surfaces in the wide clamp area 22 are not desired, the same effect can be achieved by means of an optional weight 24 attached to the wide clamp area 22 side of either threaded clamp 13 or unthreaded clamp 12.

If the reverse orientation is preferred, it can be changed by removing the weight or attaching it to the narrow clamp area 23 side of either threaded clamp 13 or unthreaded clamp 12 so that side will be preferentially oriented down.

The preceding description of the invention defines one preferred embodiment of the invention. The invention can also be realized through various modified means and changes in details, which are included within the scope of the invention. Some examples of alternative embodiments are described below:

A reverse handed thread could be used for a section of threaded sleeve 16 and a mating reverse hand thread incorporated into unthreaded clamp 12 of the preferred embodiment so that both clamps are thread driven and will move towards or away from each other when the handle 14 is turned.

Overlapping surfaces that maintain alignment of threaded base 17 and unthreaded clamp 12 can be replaced with guide rod or pins.

The entire length of axle 11 can be threaded instead of using threaded sleeve 16. In this embodiment, wheels 19 and unthreaded clamp 12 would require bearing surfaces designed to avoid being damaged or driven by the axle threads.

What is claimed is:

1. A two-wheel dolly adapted to be attached to a panel load having a first and a second side, the two-wheel dolly comprising:
   an axle having a longitudinal axis;
   a pair of wheels disposed on opposite sides of the axle and adapted to rotate about the longitudinal axis;
   a threaded clamp member threadedly coupled to the axle, the threaded clamp member including a support adapted to support the panel load, the threaded clamp member also including a base adapted to contact the first side of the panel load; and
   an unthreaded clamp member coupled to rotate freely about the axle, the unthreaded clamp member including a clamping surface adapted to contact the second side of the panel load, the unthreaded clamp member configured to couple to the threaded clamp such that the threaded and unthreaded clamp members are interlocked such that the clamp members rotate about the longitudinal axis in tandem but can independently move along the longitudinal axis.

2. The two-wheel dolly of claim 1, wherein the unthreaded clamp member is L-shaped, having an overlapping portion that is adapted to couple to the threaded clamp base.

3. A two-wheel dolly adapted to be attached to a panel load having a width, a first and a second side, the two-wheel dolly comprising:
   an axle having a longitudinal axis;
   a pair of wheels disposed on opposite sides of the axle and adapted to rotate about the longitudinal axis;
   a threaded clamp member threadedly coupled to the axle, the threaded clamp member including a support adapted to support the panel load, the threaded clamp member also including a base adapted to contact the first side of the panel load;
   an unthreaded clamp member coupled to rotate freely about the axle, the unthreaded clamp member including a first clamping surface and a second clamping surface;
   an unthreaded clamp stop fixedly coupled to the axle at a first position along the axle and limiting the movement of the unthreaded clamp member along the axle in a first direction; and
   a threaded clamp stop threadedly coupled to the axle, the threaded clamp stop adapted to define a second, variable position along the axle that is a distance from the first position, the threaded clamp stop also adapted to limit the movement of the threaded clamp member along the axle in a second direction that is opposite to the first direction,
   the unthreaded clamp member adapted to be selectively rotated relative to the axle, at each second position of the threaded clamp stop, between a first angular orientation at which the first clamping surface is in position to contact the second side of the panel load to accommodate panel loads of a first width and a second angular orientation at which the second clamping surface is in position to clamp the second side of the panel load to accommodate panel loads of a second width that is different from the first width.

4. The two-wheel dolly of claim 3, wherein the unthreaded clamp member is adapted, when the two-wheel dolly is placed on a work surface, to rotate to the first angular orientation.

5. The two-wheel dolly of claim 4, wherein the unthreaded clamp member further includes a selectively attachable weight, and wherein the unthreaded clamp member, when the weight is attached, is adapted to rotate to the second angular orientation.

6. A two-wheel dolly adapted to be attached to a panel load having a first side and a second side and to transport the panel load across a work surface, the two-wheel dolly comprising:
   an axle having a longitudinal axis;
   a pair of wheels disposed on opposite sides of the axle and adapted to rotate about the longitudinal axis;
   a threaded clamp member threaded coupled to the axle, the threaded clamp member including a support adapted to support the panel load, the threaded clamp member also including a base adapted to contact the first side of the panel load;
   an unthreaded clamp member coupled to rotate freely about the axle, the unthreaded clamp member including a clamping surface adapted to contact the second side of the panel load, the unthreaded clamp member configured to couple to the threaded clamp such that the threaded and unthreaded clamp members are interlocked such that the clamp members rotate about the longitudinal axis in tandem but can independently move along the longitudinal axis.
   an unthreaded clamp stop fixedly coupled to the axle at a first position along the axle and limiting the movement of the unthreaded clamp member along the axle in a first direction; and
   a threaded clamp stop threadedly coupled to the axle, the threaded clamp stop adapted to define a second, variable position along the axle that is a distance from the first position, the threaded clamp stop also adapted to limit the movement of the threaded clamp member along the axle in a second direction that is opposite to the first direction; and
   a handle fixedly coupled to the axle, wherein manual rotation of the handle in a first angular direction biases the threaded clamp stop toward the unthreaded clamp stop to apply a clamping force to the panel load, and wherein manual rotation of the handle in a second angular direction opposite the first angular direction biases the threaded clamp stop away from the unthreaded clamp stop to remove the clamping force.

7. The two-wheel dolly of claim 6, wherein movement of the two-wheel dolly along the work surface in a first direction biases the threaded clamp stop toward the second clamp stop to apply the clamping force, and wherein movement of the two-wheel dolly along the work surface in a second direction that is opposite the first direction biases the threaded clamp stop away from the unthreaded clamp stop to remove the clamping force.

8. The two-wheel dolly of claim 6, the dolly adapted to be attached to a panel load having a width,
wherein the unthreaded clamp member is adapted to be selectively rotated relative to the axle, at each second position of the threaded clamp stop, between a first angular orientation at which the first clamping surface is in position to contact the second side of the panel load to accommodate panel loads of a first width and a second angular orientation at which the second clamping surface is in position to clamp the second side of the panel load to accommodate panel loads of a second width that is different from the first width.

9. The two-wheel dolly of claim 8, wherein the unthreaded clamp member is adapted, when the two-wheel dolly is placed on a work surface, to rotate to the first angular orientation.

10. The two-wheel dolly of claim 9, wherein the unthreaded clamp member further includes a selectively attachable weight, and wherein the unthreaded clamp member, when the weight is attached, is adapted to rotate to the second angular orientation.

11. The two-wheel dolly of claim 6, further comprising a threaded sleeve affixed to the axle and coupled to the threaded clamp member and the threaded clamp stop.

12. The two-wheel dolly of claim 6, wherein the axle is formed with threads that are coupled to the threaded clamp member and the threaded clamp stop.

\* \* \* \* \*